(No Model.)

J. M. FRENCH.
BRIDLE BIT.

No. 319,897. Patented June 9, 1885.

WITNESSES:
H Brown
A. L. White

INVENTOR:
John M French
by Wright H Brown
Atty.

N. PETERS, Photo-Lithographer, Washington, D. C.

UNITED STATES PATENT OFFICE.

JOHN M. FRENCH, OF CHELSEA, ASSIGNOR OF ONE-HALF TO GEORGE B. FISHER, OF MILLIS, MASSACHUSETTS.

BRIDLE-BIT.

SPECIFICATION forming part of Letters Patent No. 319,897, dated June 9, 1885.

Application filed March 19, 1885. (No model.)

*To all whom it may concern:*

Be it known that I, JOHN M. FRENCH, of Chelsea, in the county of Suffolk and State of Massachusetts, have invented certain Improvements in Bridle-Bits, of which the following is a specification.

This invention relates to a bridle-bit composed of two hooks or hooked fingers which are inserted between the teeth and cheeks of the horse as a substitute for the connecting-bar passing through the mouth from side to side. Heretofore in this class of bits the two hooks have been connected by a curved cross-bar rigidly attached to each and passing under the lower jaw, as shown in Letters Patent No. 312,182, granted to Brott & Andrews, the hooks being thus held at a fixed distance from each other, so that they cannot adapt themselves to jaws of different widths.

My invention consists in making the hooks independent of each other—*i. e.*, without rigid connection—and in providing each hook with a plate or flange having orifices to receive the cheek-pieces of the bridle, the driving-reins, and, if desired, a flexible strap to pass under the lower jaw, the hooks being thus enabled to adjust themselves to the width of the jaw and kept in the proper position with relation to the jaws of the animal, as I will now proceed to describe.

Figure 1:
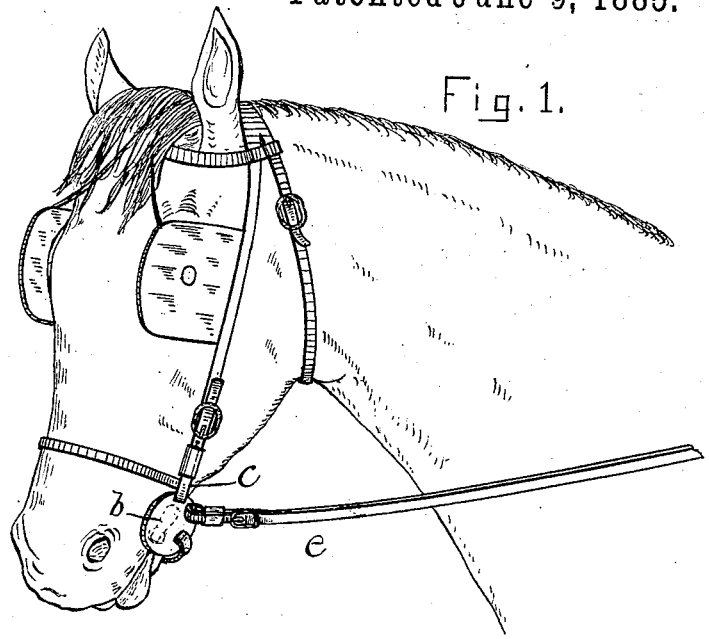
Figure 2:
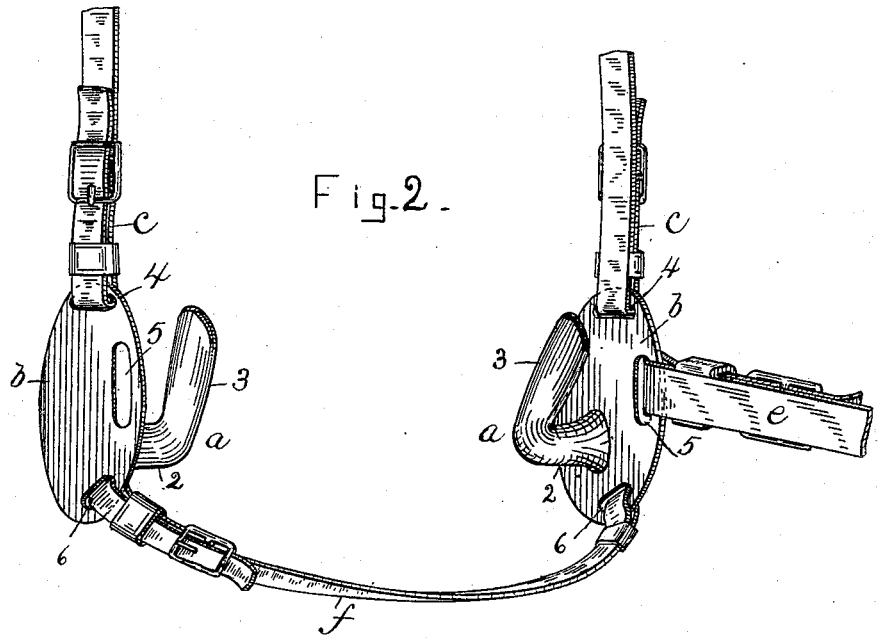

Of the accompanying drawings, forming a part of this specification, Figure 1 represents a perspective view of a horse's head and a bridle having my improved hooks. Fig. 2 represents a perspective view of the two hooks which constitute the bit.

The same letters of reference indicate the same parts in all the figures.

In the drawings, $a$ $a$ represent the two mouth-hooks which constitute the bit, said hooks being composed of the rounded shorter arms, 2 2, projecting inwardly, and the flattened longer arms, 3 3, standing substantially at right angles with the arms 2 2.

In carrying out my invention I make the hooks in separate or detached parts instead of connecting them by a rigid bar, as heretofore, and provide them with flanges or plates $b$ $b$, attached to the outer ends of the arms 2, said plates being formed to rest against the outer surfaces of the lips at the corners of the mouth. Said plates are provided with slots 4 4, through which pass the cheek-pieces $c$ $c$ of the bridle, and with slots 5 5, through which the driving-reins $e$ $e$ pass. The cheek-pieces and reins engaged with the slotted plates keep the hooks at the proper angle between the cheeks and jaws and prevent the hooks from being turned from their proper position by the pulling force exerted on the reins, the hooks being kept in position more perfectly than by the rigid connecting-bar heretofore used, while the absence of any rigid connection between the hooks enables them to adapt themselves readily to the width of the jaw. I prefer to connect the hooks $a$ $a$ by a flexible strap, $f$, secured to the plates $b$ $b$ by means of slots 6 6 formed in their lower portions.

It will be seen that my invention accomplishes more than the mere elimination of the rigid bar connecting the hooks. Were the bar to be removed from the hooks in the bit shown in the Brott & Andrews patent, the rings on said hooks would not afford a means of connection to the bridle and reins, which would enable said parts to keep the hooks in their proper position, because of the lack of positiveness in the connection afforded by said rings, which slip or turn in the loops of the bridle and reins. My slotted plates cannot thus slip or turn and constitute a positive connection between the hooks and the bridle.

I claim—

1. A bridle-bit composed of two independent hooks, each having a rigidly-attached external tongue or plate, whereby it may be attached to the bridle, as set forth.

2. The combination, with the cheek-pieces of a bridle, of the independent hooks $a$ $a$, having the plates $b$ $b$, slotted to receive the cheek-pieces and the driving-reins, as set forth.

3. The combination of the bridle cheek-pieces, the independent hooks $a$ $a$, secured to the bridle, and the flexible strap $f$, connecting said hooks, as set forth.

In testimony whereof I have signed my name to this specification, in the presence of two subscribing witnesses, this 17th day of March, 1885.

JOHN M. FRENCH.

Witnesses:
C. F. BROWN,
A. L. WHITE.